(12) United States Patent
Steinle et al.

(10) Patent No.: US 7,689,729 B2
(45) Date of Patent: Mar. 30, 2010

(54) METHOD FOR IMPLEMENTING RESETS IN TWO COMPUTERS

(75) Inventors: Claus Steinle, Stuttgart (DE); Andreas Kneer, Wendlingen (DE)

(73) Assignee: Robert Bosch GmbH, Stuttgart (DE)

( * ) Notice: Subject to any disclaimer, the term of this patent is extended or adjusted under 35 U.S.C. 154(b) by 614 days.

(21) Appl. No.: 11/126,051

(22) Filed: May 9, 2005

(65) Prior Publication Data

US 2005/0256987 A1   Nov. 17, 2005

(30) Foreign Application Priority Data

May 12, 2004   (DE) .................. 10 2004 023 329

(51) Int. Cl.
*G06F 3/00* (2006.01)
(52) U.S. Cl. ..................... 710/10; 710/104
(58) Field of Classification Search ............ 710/104, 710/110, 8, 10; 712/7
See application file for complete search history.

(56) References Cited

U.S. PATENT DOCUMENTS

| 5,067,088 | A | * | 11/1991 | Schneiderhan | ............ 700/221 |
| 5,606,715 | A | * | 2/1997 | Yishay et al. | ................. 712/43 |
| 5,867,728 | A | * | 2/1999 | Melo et al. | ..................... 710/8 |
| 6,073,253 | A | * | 6/2000 | Nordstrom et al. | ........... 714/25 |
| 6,272,582 | B1 | * | 8/2001 | Streitenberger et al. | ..... 710/314 |

* cited by examiner

*Primary Examiner*—Clifford H Knoll
(74) *Attorney, Agent, or Firm*—Kenyon & Kenyon LLP

(57) ABSTRACT

A method and computer program for implementing a reset both in a master computer and a slave computer which are both connected to a shared data bus. To allow a different reset configuration of both computers even when the slave computer, in particular, has no possibility of an internal slave-reset configuration, the method provides that the slave computer is configured with a slave-reset configuration which is provided to the slave computer by the master computer, reset-configured beforehand, via the data bus.

8 Claims, 2 Drawing Sheets

METHOD FOR IMPLEMENTING RESETS IN TWO COMPUTERS

FIELD OF THE INVENTION

The present invention relates to a method for implementing a reset in both a master computer and an associated slave computer which are both connected to a common data bus. Furthermore, the present invention relates to a computer program and a master computer for implementing this method.

BACKGROUND INFORMATION

It is known from the related art that both a master computer and a slave computer can be connected to a shared data bus. In such a hardware constellation the two computers must generally be configurable with different reset configurations, which hereinafter will be referred to as master-reset configuration and slave-reset configuration, respectively. As a rule, the two computers have internal memories via which internal standard reset configurations can be called up. However, due to the mentioned hardware constellation, it is possible that the internal reset configuration cannot be utilized in any of the two computers, or at least in the slave computer. This will then have the disadvantage that a shared operation of both master computer and slave computer on the shared data bus is impossible.

SUMMARY OF THE INVENTION

Proceeding from this related art, it is an objective of the present invention to further develop a known method for implementing a reset both in a master computer and in a slave computer which are both connected to a common data bus, namely in such a manner that the master and the slave computer are configurable with different reset configurations notwithstanding the fact that the slave computer, in particular, cannot implement an internal slave-reset configuration.

This objective is achieved by the method according to the present invention, in which the slave computer is configured with a slave-reset configuration that is provided by the master computer via the data bus, the master bus having been reset-configured beforehand.

During the configuration of both the master computer and the slave computer, the data bus is blocked to usual data traffic as it normally takes place in normal operation of the two computers after the configuration. Instead, the data bus functions only as a simple electrical line, especially while the master bus is being configured.

The present invention provides a successively implemented configuration of the two computers to thus allow a configuration of the slave computer by the master computer configured beforehand. This approach offers the advantage that the two computing devices are each able to be configured with different reset configurations despite being connected to the shared data bus and without accessing internal reset configurations. The reset configuration of the master computer realized in this manner is called master-reset configuration hereinafter, whereas the reset configuration of the slave computer is analogously referred to as slave-reset configuration.

In an advantageous manner, the master computer configures itself in response to a reset start command in that it reads in predefined electrical voltage potentials representing the master-reset configuration at its data-bus port configured as input ports.

To prevent a simultaneous reading-in of these predefined electrical voltage potentials by the slave computer at its data-bus ports and a corresponding, i.e., undesired substantially identical, reset configuration of the slave computer, it should advantageously be kept in a reset-original state during the reset configuration of the master computer.

The aforementioned objective of the present invention is also achieved by a computer program as well as a master computer for implementing the method. The advantages of these achievements correspond to the advantages mentioned previously in connection with the claimed method.

DETAILED DESCRIPTION

Figure 1:
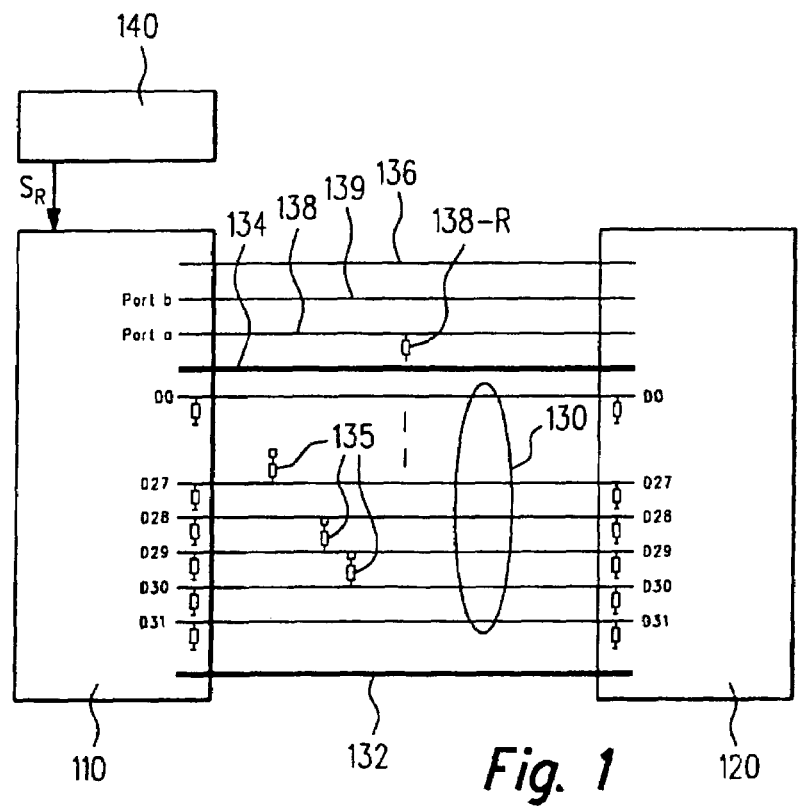
FIG. 1 shows a hardware constellation on which the present invention is based.

FIG. 1 shows the hardware constellation on which the present invention is based as it may be provided in a control unit, for example. This hardware constellation includes a master computer 110 and a slave computer 120, which are both connected to a shared data bus 130. Moreover, the two computers 110, 120 are connected to a shared address bus 132, a shared control bus 134 and also to a shared timing circuit 136. In addition, according to the present invention, a first port a of master computer 110 is designed to output to slave computer 120 a reset-release signal that indicates the end of the master configuration. Furthermore, according to the present invention a second port b of master computer 110 is provided and designed to output to slave computer 120 a data-bus release signal that indicates the release of the data bus to normal data traffic after the slave-reset configuration has been concluded. Both master computer 110 and slave computer 120 are microcontrollers, for instance.

Finally, the hardware constellation includes a reset generator 140 for generating a reset signal and for outputting this reset signal to master computer 110.

Figure 2:
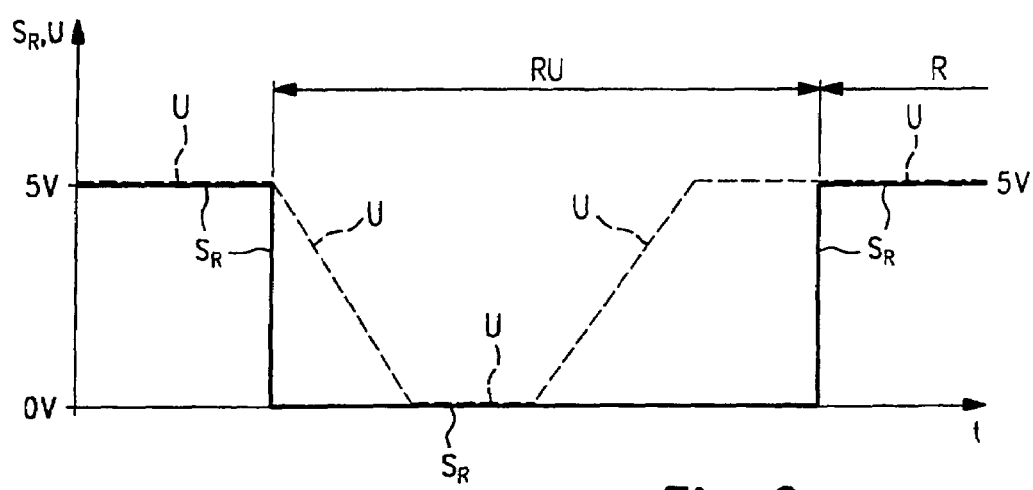
FIG. 2 shows the profile of a reset signal.

FIG. 2 illustrates typical profiles of digital reset signal $S_R$ and a supply voltage U for a computer, regardless of whether the computer is operated as master or slave.

The initial situation for a subsequent reset of the computer first of all is always a drop in supply voltage U below a predefined voltage level of 5 volt, for instance, as shown in FIG. 2. Reset signal $S_R$ thereupon goes from a high level (inactive state) to a low level (0V), i.e., into an active reset state; the computer to be reset will then be in a so-called unconfigured reset-original state RO. Original state RO is a rest state during which computer 110 neither reconfigures itself nor executes user programs. This original state lasts for as long as reset signal $S_R$ is active. The reset signal reassumes the inactive high-level state once supply voltage U has reached the predefined voltage level again or exceeds it.

This change in the voltage level of reset signal $S_R$ will subsequently be denoted as reset start command; this start command ends the reset-original state of the computer and triggers the actual reset process R during which the computer configures itself with a predefined reset configuration.

In the following, the method of the present invention for implementing resets with different reset configurations in master computer 110 and slave computer 120 will be discussed in greater detail with reference to FIGS. 1 to 3.

Figure 3:
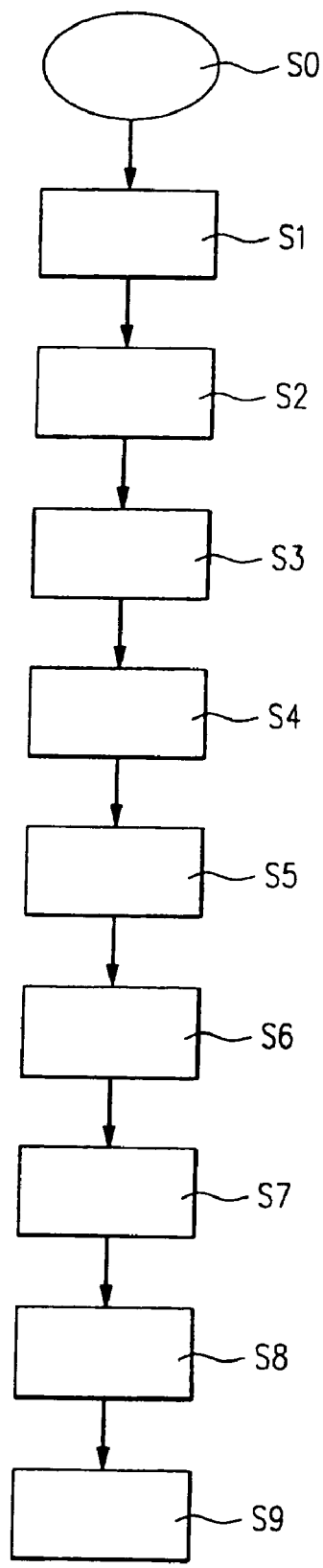
FIG. 3 shows the method according to the present invention.

FIG. 3 shows the sequence of the method according to the present invention. The starting point, in method step S1, first is the initiation of a reset procedure by a drop in the voltage level of reset signal $S_R$ to below the predefined threshold value. As soon as master computer 110 detects this drop in the voltage level of reset signal $S_R$, it assumes the reset-original state. At the same time, the master computer also brings slave computer 120 into this reset-original state via its first port a and connection line 138. Connection line 138 runs to ground, preferably by way of a pull-down resistor 138-R.

However, as soon as the voltage level of reset signal $S_R$ exceeds the threshold value once predefined time duration T has elapsed and the reset start command is generated in this manner, master computer 110 begins with its own reset configuration. To this end, it reads in predefined voltage potentials at its data-bus ports such as D27, D29 and D30, which are configured as input ports at this time, and interprets these read-in voltage potentials as master-reset configuration predefined for it. The voltage potentials are individually specified by the size of individual voltage splitters 135 connected to different lines of the data bus (method step S2).

The reading in of the voltage potentials as master-reset configuration is possible because both computers are not yet reset-configured at this early time after initiation of the reset, and data bus 130 is still blocked to normal data traffic. The lines of the data bus then function as ordinary electrical lines.

In a subsequent method step S3, master computer 110 configures itself in accordance with the master-reset configuration just read in.

After the reset configuration of master computer 110 has been concluded, master computer 110 starts a computer program that first configures its data-bus ports D00 . . . 31, currently still configured as input ports, as output ports (method step S4). This program then sends the slave-reset configuration predefined for slave computer 110 onto data bus 130 via the output ports (method step S5).

Subsequently, in a method step S6, master computer 110 allows slave computer 120 to leave the reset-original state in which slave computer 120 had been until that time. The release of slave computer 120 to leave its reset-original state is advantageously implemented by a potential change on connection line 138 between slave computer 120 and first port a of master computer 110.

In a subsequent method step S7, the slave computer then configures itself. To this end, slave computer 120 reads in to its own data-bus ports the slave-reset configuration provided by master computer 110 via data bus 130 and configures itself in accordance with the slave-reset configuration received in this manner.

After conclusion of its configuration, it will often not be desirable that slave computer 120 begins with the execution of user programs immediately. This usually makes sense only after data bus 130 has been released for regular data traffic. Master computer 110 may indicate the release of data bus 130 for normal data traffic to slave computer 120 in the form of a suitable voltage level on connection line 139 (cf. FIG. 1). The release of the data bus is controlled by master computer 110 as well. As an alternative to indicating the data-bus release via line 139, it is also possible to first configure slave computer 120 into a so-called peripheral mode once its configuration has been completed, thereby bringing it into a suitable waiting state until the data bus is released. After release of the data bus, master computer 110 then clears slave computer 120 for the execution of user programs by either switching it from the peripheral mode to a slave mode or, as mentioned, modifying the voltage level on line 139 accordingly (method step S9).

The method of the present invention is preferably realized in the form of a computer program for master computer 110. The computer program is part of the firmware (bios) of the computer. This computer program, together with additional computer programs, may be stored on a data carrier. When the computer program is used, it is stored in a solid state memory, preferably a flash memory, as data carrier. For the purpose of transmission or sale of the computer program to a customer, the data carrier may be a diskette, a compact disc or the like. As an alternative to a transmission via data carrier, a transmission to the customer without the aid of the data carrier is possible as well, for instance via an electronic communication network, especially the Internet.

What is claimed is:

1. A method for implementing a reset in both a master computer and a slave computer which are both connected to a shared data bus, the method comprising:
configuring the master computer with a master-reset configuration in response to a reset start command;
configuring at least one data-bus port of the master computer as an output port, after configuring the master computer with the master-reset configuration;
outputting a slave-reset configuration, different from the master-reset configuration, onto the data bus via the at least one data-bus port of the master computer, after configuring the at least one data-bus port of the master computer; and
configuring the slave computer with the slave-reset configuration.

2. The method according to claim 1, wherein the configuration of the master computer with the master-reset configuration is implemented in that the master computer reads in at its data-bus ports configured as input ports predefined electrical voltage potentials which represent the master-reset configuration, and then configures itself.

3. The method according to claim 1, wherein the slave computer is kept in a reset-original state during the configuration of the master computer.

4. The method according to claim 3, wherein the configuration of the slave computer includes the following steps:
releasing the slave computer from the reset-original state; and
reading in the slave-reset configuring from the data bus into the slave computer and correspondingly self-configuring the slave computer.

5. The method according to claim 1, wherein the master computer releases the data bus for general accessing of the data bus as it is required when executing user software, only once the configuration of the slave computer has been concluded.

6. A computer program stored in a master computer which is connected to a slave computer via a data bus, the computer program being configured to implement the following method:
configuring the master computer with a master-reset configuration in response to a reset start command;
configuring at least one data-bus port of the master computer as an output port, after configuring the master computer with the master-reset configuration;
outputting a slave-reset configuration, different from the master-reset configuration, onto the data bus via the at least one data-bus port of the master computer, after configuring the at least one data-bus port of the master computer; and
configuring the slave computer with the slave-reset configuration.

7. A master computer which is connected to a slave computer via a data bus and adapted to configure itself with a master-reset configuration in response to a reset command, the master computer comprising:

means for outputting, by the previously-configured master computer, onto the data bus at its output ports a slave-reset configuration, different from the master-reset configuration, for the slave computer; and means for inducing, by the previously-configured master computer, the slave computer to configure itself with the slave-reset configuration.

8. The master computer according to claim 7, further comprising means for outputting to the slave computer at least one of (a) a reset-release signal that indicates an end of the master-reset configuration and (b) a data-bus release signal that indicates a release of the data bus to normal data traffic after conclusion of the slave-reset configuration.

* * * * *